the fabrication of decorative, structural and functional
3,370,095
PREPARATION OF VINYL ETHERS James F. Vitcha, New Providence, N.J., assignor, by mesne assignments, to Air Reduction Company, Incorporated, New York, N.Y., a corporation of New York
No Drawing. Filed Oct. 22, 1965, Ser. No. 502,457
7 Claims. (Cl. 260—614)

This invention relates to a novel process for preparing vinyl ethers.

Vinyl ethers are useful compounds which have been employed in a variety of applications. They are used as intermediates and as monomers in the preparation of homopolymers and inter-polymers, which polymers are useful in coating and film-forming compositions, and in the fabrication of decorative, structural and functional products.

Various processes have been proposed for the preparation of vinyl ethers. It has been proposed, for example, to effect "vinylation" of an alcohol by reacting acetylene and the alcohol in the presence of basic substances, e.g. alkali metal hydroxides. Such a process is described in Reppe U.S. Patent 1,959,927 of May 22, 1934. This process, however, requires the use of high pressures and is accompanied by the hazards necessarily associated with high-pressure acetylene operations. In addition, prolonged periods of reaction are generally necessary. In order to avoid the hazards of high acetylene pressures, it has been proposed to carry out the reaction between acetylene and alcohols at ordinary pressures in an inert reaction medium such as liquid paraffin. Although this obviates the above-mentioned hazards, substantial large quantities of the alkali metal hydroxide are consumed. It has been proposed to avoid these drawbacks of the reaction by using potassium alkoxides, e.g. potassium butylate, in place of alkali metal hydroxides. Aside from the fact that potassium alkoxides are relatively expensive, it has been found that their life in the inert reaction medium is short. Furthermore, yields are generally low and the process is of little commercial value. It has, therefore, been further proposed not only to use the expensive potassium alkoxide but to use expensive and difficultly-handled reaction media, such as secondary or tertiary aromatic amines, e.g. dibenzyl aniline.

The process of this invention is particularly characterized by its ability to produce high yields of the desired ether even at substantially atmospheric pressure and with commercial low-cost catalysts. Thus, commercial grades of catalyst, e.g. hydrous potassium hydroxide can be used without prior purification or dehydration. Catalyst attrition is surprisingly low and substantially lower catalyst concentrations are fully effective. The process also provides a reaction medium which can be used in the preparation of a wide variety of vinyl ethers and it is possible to change from one product to another during production without replacing the reaction medium.

In the practice of this invention, the vinylation of a lower alcohol with acetylene is carried out in the presence of a reaction medium which is a higher alcohol, a vinyl ether of the higher alcohol, or mixtures of the alcohol and its vinyl ether. The reaction medium in the form of a stationary phase to which is added the reactant lower alcohol and acetylene and from which the product vinyl ether of the lower alcohol, together with unconverted reactants, is removed. The reaction medium or stationary phase may be used in the form of a body of liquid, adsorbed on a carrier in a fluidized bed or column, etc.

The reactant lower alcohol employed in the practice of this invention will preferably be a saturated lower aliphatic monohydric alcohol. Preferably, the lower alcohol will contain less than about five carbon atoms and will have a boiling point, at atmospheric pressure, below about 120° C. Examples of the preferred lower alcohols include methanol, ethanol, n-propanol, isopropanol, n-butanol, isobutanol, and sec-butanol. In accordance with the process of this invention, the lower alcohol reactant is converted to the corresponding vinyl ether.

The reaction is carried out in the presence of the reaction medium defined above. The term "higher alcohol" is used to designate a saturated aliphatic alcohol containing between about 10 and 22 carbon atoms. The preferred higher alcohols are higher saturated aliphatic monohydric alcohols containing between about 10 and 18 carbon atoms and having a boiling point, at atmospheric pressure, of at least about 200° C. These preferred higher alcohols include decyl, undecyl alcohol, lauryl alcohol, tridecyl alcohol, tetradecyl alcohol, cetyl alcohol, octadecyl alcohol, etc. Various isomers of these alcohols may be employed. The higher alcohol may also bear inert substituents, i.e. substituents which are not reactive toward any of the components of the reaction mixture under the reaction conditions.

The vinyl ether of the higher alcohol may conveniently be prepared by the reaction of the desired alcohol with acetylene. In certain embodiments of this invention, the vinyl ether of the higher alcohol is prepared in situ. For example, the higher alcohol may be mixed with the lower alcohol to be vinylated and acetylene added thereto under the reaction conditions hereinafter described and in an amount in excess of that required to react completely with the higher alcohol, i.e. greater than one mole per mole of higher alcohol. The acetylene is found to react initially primarily with the higher alcohol until it has been converted to a large extent to the corresponding vinyl ether which thereafter functions as the desired reaction medium. Additional acetylene vinylates the lower alcohol.

The vinylation process of this invention is preferably carried out in the presence of a strongly alkaline vinylation catalyst such as an alkali-metal oxide or hydroxide, an alkali-metal cyanide, or an alkali-metal alkoxide or aryloxide. The most preferred catalyst is an alkali-metal hydroxide such as potassium hydroxide. One of the features of this invention is that the catalyst is effective at very low concentrations, typically as low as 2% based on the weight of the reaction medium calculated as the vinyl ether of the higher alcohol. In practice, it is preferred to use between about 5% and 15% by weight of the catalyst. Substantially larger amounts of catalyst may be employed but little or no compensating additional advantages may be realized thereby.

The reaction between the lower alcohol and the acetylene is effected by mixing them together in the presence of the reaction medium. Preferably, the reaction is conducted at an elevated temperature which is higher than the boiling point of the reactants and the product at the pressure employed, but lower than the boiling point of the vinyl ether of the higher alcohol. Temperatures between about 160 and 200° C. are most preferred. Although a major advantage of this invention is that elevated pressures can be avoided while still obtaining satisfactory yields and reaction rates, pressures above atmospheric may be employed if desired.

For convenience of operation, the catalyst is generally dispersed in the reaction medium and the so-formed mixture is heated to the desired reaction temperature, with agitation. The acetylene and lower alcohol are then added in the desired proportions, preferably in the vapor phase. For example, the lower alcohol can be heated to boiling and the vapors produced mixed with acetylene in a predetermined ratio and passed into the reaction medium. As the vinyl ether of the lower alcohol is formed, it is vaporized and thereby separated from the reaction medium, together with unreacted acetylene and lower alcohol. The product can then be separated by fractional distillation.

The reaction can be run in a continuous or a batch manner. The mixture of catalyst and the reaction medium can be employed with a carrier as a fluidized bed or column. The vinyl ether of the higher alcohol can be formed in situ as hereinbefore described by mixing together the lower alcohol, the higher alcohol and the catalyst, heating the mixture to the desired reaction temperature and adding acetylene thereto. Other variations in the process of this invention will be apparent to those skilled in the art. An important feature of initially using the higher alcohol as the reaction medium and converting it to the corresponding vinyl ether in situ is that the alkali-metal hydroxide catalyst is soluble in the higher alcohol but is insoluble in the vinyl ether of the higher alcohol. Consequently, as the higher alcohol is vinylated, the alkali-metal hydroxide catalyst, regardless of its original particle size, separates in very finely divided form to provide a desired suspension of the catalyst in the reaction medium with high surface area.

The ratio of acetlyene to lower alcohol may be varied over a considerable range, since unreacted material is readily recovered and recycled. Preferably, the lower alcohol is employed in excess of the stoichiometric amount in order to minimize the amount of unreacted acetylene present. Lower alcohol to acetylene ratios of about 1:1 to about 2:1, excluding the stoichiometric quantity of acetylene required to react with the higher alcohol when the higher alcohol, rather than the preformed vinyl ether of the higher alcohol is used as the initial reaction medium, are generally satisfactory. The rate at which the reactants are added will vary depending upon equipment used, reaction conditions, the nature of the reactants, etc. Generally, an addition rate corresponding to between about 0.05 and 5 moles of acetylene per hour per mole of catalyst will be satisfactory.

The vinyl ether can be separated from unreacted starting materials by fractional distillation. If desired, the product mixture may be condensed and then fractionally distilled, preferably through an efficient fractionating column. Alternatively, the product mixture may be passed through a series of cold traps to achieve separation. For example, unreacted lower alcohol is removed by a cold water trap and the vinyl ether of the lower alcohol is removed by a Dry Ice-acetone trap.

The process of this invention is particularly suitable for commercial operation since it is both economic and flexible. Comparatively low catalyst concentrations are required. A variety of end products can be obtained simply by changing or modifying the lower alcohol added without the necessity of replacing the reaction medium. The process can be readily adapted to continuous operation.

It is a particular feature of the process of this invention that catalyst attrition or deactivation is surprisingly lower than has been observed with prior art processes. Furthermore, the process can be stopped and again started up, with the same conversions or yields as those obtained just prior to shutdown. This is of considerable benefit when the process is operated on a shift basis since it offers a convenient technique for maintaining yields at a high level.

The following examples are provided to illustrate the invention further and to set forth the manner in which it is now preferred to practice this invention. It will be understood, however, that the invention is not limited to the specific embodiments described. Many variations will occur to those skilled in the art or will be obvious from the description given herein and many variations can be made without departing from the scope of this invention. The invention is not to be limited except as defined in the appended claims.

*Example 1*

In a one-liter flask fitted with a stirrer, a gas inlet tube and a distillation head connected to a condensing system are placed 400 grams of octadecyl alcohol. The octadecyl alcohol is heated to its melting point and the system is purged with nitrogen. After purging, 23.6 grams of 85% pellet potassium hydroxide are added and the temperature is raised to 180° C. Ethanol and acetylene are metered into the reactor through the gas inlet tube at the ratio and flow rate specified in Table I. It is found that the octadecyl alcohol is gradually converted to vinyl octadecyl ether so that the reaction medium is initially octadecyl alcohol, then a mixture of octadecyl alcohol and octadecyl vinyl ether, and finally substantially entirely octadecyl vinyl ether. After the initial 3.25 hours of operation, an additional 23.6 grams of 85% pellet potassium hydroxide is added to bring the catalyst concentration to 10%. Unreacted acetylene in the product is measured and the conversion of acetylene to ethyl vinyl ether is calculated on the basis of total acetylene added and total acetylene consumed, taking into account the formation of octadecyl vinyl ether from the octadecyl alcohol. Conversion is calculated as moles of ethyl vinyl ether recovered divided by moles of acetylene consumed or added.

TABLE I

| Run Number | Running Time (hrs.) | $C_2H_2$ Flow (mols/hr.) Input | $C_2H_2$ Flow (mols/hr.) Reacted | EtOH Flow (mols/hr.) | Ratio $C_2H_2$, EtOH | Percent Conversion $C_2H_2$ In | Percent Conversion $C_2H_2$ Reacted | Total Gms. Ether Made |
|---|---|---|---|---|---|---|---|---|
| 1 | 3.25 | 0.86 | 0.33 | 1.27 | 1:1.6 | 5.3 | 12.8 | 10 |
| 2 | 3.0 | 0.87 | 0.63 | 1.27 | 1:1.46 | 35.1 | 49.0 | 66.5 |
| 3 | 6.75 | 0.86 | 0.71 | 1.26 | 1:1.46 | 73.7 | 87.5 | 308 |
| 4 | 7.0 | 0.87 | 0.7 | 1.26 | 1:1.46 | 74.3 | 92.3 | 325 |
| 5 | 5.5 | 0.88 | 0.75 | 1.26 | 1:1.43 | 76.0 | 89.0 | 263 |
| 6 | 7.0 | 1.36 | 1.10 | 1.84 | 1:1.35 | 74.0 | 91.3 | 506 |
| 7 | 7.0 | 1.80 | 1.35 | 2.46 | 1:1.37 | 69.0 | 91.3 | 624 |
| 8 | 6.5 | 1.73 | 1.21 | 2.40 | 1:1.39 | 64.3 | 92.0 | 520 |
| 9 | 8.0 | 1.77 | 1.20 | 2.41 | 1:1.37 | 61.3 | 89.6 | 625 |

When operation of this system is discontinued after 54 hours of operation, the catalyst is found to be still active. Vapor phase chromatograms of the last product produced show primarily ethyl vinyl ether and ethanol, with only a small amount of acetylene.

*Example 2*

In a one-liter flask equipped with a stirrer, gas inlet tube and distillation head there are placed 400 grams of octadecyl alcohol and 47.2 grams of 85% potassium hydroxide pellets. The mixture is maintained at 180° C. and a mixture of acetylene and isopropanol are metered in at the rates given in Table II. The conversions of acetylene to isopropyl vinyl ether, based on total acetylene added and total acetylene consumed is shown in Table II.

TABLE II

| Run Number | Hours of Operation | Flow Rate C₂H₂ moles/hr. | Ratio PrOH:C₂H₂ | Conversions of C₂H₂ to isopropyl vinyl ether | |
|---|---|---|---|---|---|
| | | | | Based on C₂H₂ Added | Based on C₂H₂ Consumed |
| 1 | 3.25 | 0.865 | 0.86:1 | 5.2 | 10.7 |
| 2 | 7.0 | 0.92 | 1.37:1 | 65.3 | 78.8 |
| 3 | 7.0 | 1.52 | 1.45:1 | 49.0 | 85.0 |

*Example 3*

In a one-liter flask equipped with a stirrer, gas inlet tube and distillation head there is placed 400 grams of octadecyl alcohol and 70.8 grams of 85% potassium hydroxide pellets. The mixture is heated to 180° C. and methanol and acetylene are metered in through the gas inlet tube at a flow rate of 0.8 mole per hour of acetylene and a methanol to acetylene ratio of 1.64:1. The flow is maintained for 7 hours, after which the catalyst is found to be still active. The overall conversion of acetylene to methyl vinyl ether is 62% based on the acetylene added and 79.2% based on the acetylene consumed.

It will be apparent to those skilled in the art that various changes and modifications may be made in the embodiments described above without departing from the invention, as defined in the appended claims. It is intended, therefore, that all matter contained in the foregoing description shall be interpreted as illustrative only and not as limitative of the invention.

I claim:

1. The process for preparing vinyl ethers which comprises reacting together acetylene with an excess of a lower alkanol containing less than about five carbon atoms in a reaction medium consisting essentially of at least one member of the group consisting of a higher alkanol containing between about 10 and 22 carbon atoms, and the vinyl ether of a higher alkanol containing between about 10 and 22 carbon atoms, thereby forming the vinyl ether of said lower alkanol, the reaction being carried out at substantially atmospheric pressure and a temperature of 160–200° C. in the presence of about 5–15% by weight of an alkali metal hydroxide vinylation catalyst based on the weight of said reaction medium.

2. The process of claim 1, wherein said lower alkanol is methanol.

3. The process of claim 1, wherein said higher alkanol is octadecyl alcohol.

4. The process for preparing vinyl ethers which comprises the steps of mixing together a lower alkanol containing less than about five carbon atoms, a reaction medium consisting essentially of a higher alkanol containing between about 10 and 22 carbon atoms and an alkali metal hydroxide vinylation catalyst, adding to the so-formed mixture acetylene in the amount of greater than one mole per mole of said higher alkanol, and maintaining the mixture at a temperature between about 160 and 200° C. and at substantially atmospheric pressure thereby forming the vinyl ether of said lower alkanol.

5. The process of claim 4, wherein said alkali metal hydroxide vinylation catalyst is potassium hydroxide.

6. The process of claim 4, wherein said lower alkanol is ethanol.

7. The process of claim 4, wherein said lower alkanol is isopropanol.

References Cited

UNITED STATES PATENTS

| 1,959,927 | 5/1934 | Reppe. | |
| 2,472,084 | 6/1949 | Beller et al. | 260—614 |

FOREIGN PATENTS

| 661,432 | 4/1963 | Canada. |
| 616,197 | 1/1949 | Great Britain. |

LEON ZITVER, *Primary Examiner.*

H. T. MARS, *Assistant Examiner.*